United States Patent
Najmr et al.

(10) Patent No.: US 12,354,071 B2
(45) Date of Patent: Jul. 8, 2025

(54) UPDATING RENDERINGS OF DYNAMIC ITEMS BASED ON CRYPTOGRAPHICALLY SECURE TRANSACTIONS

(71) Applicant: L'Oreal, Paris (FR)

(72) Inventors: Stan Najmr, Rahway, NJ (US); Gabriella Bahamondes, Linden, NJ (US); Luisa Gonzalez, Totowa, NJ (US); Michelle Salese, South Plainfield, NJ (US)

(73) Assignee: L'Oreal, Paris (FR)

( * ) Notice: Subject to any disclaimer, the term of this patent is extended or adjusted under 35 U.S.C. 154(b) by 321 days.

(21) Appl. No.: 18/148,105

(22) Filed: Dec. 29, 2022

(65) Prior Publication Data

US 2024/0220952 A1 Jul. 4, 2024

(51) Int. Cl.
*G06Q 20/12* (2012.01)
*G06Q 20/38* (2012.01)

(52) U.S. Cl.
CPC ....... *G06Q 20/1235* (2013.01); *G06Q 20/389* (2013.01); *G06Q 2220/165* (2013.01)

(58) Field of Classification Search
CPC ........................................................ H04L 9/50
See application file for complete search history.

(56) References Cited

U.S. PATENT DOCUMENTS

| | | | | |
|---|---|---|---|---|
| 2022/0300966 A1* | 9/2022 | Andon | ..................... | G06T 11/60 |
| 2023/0070586 A1* | 3/2023 | Kapur | ................... | G06Q 20/123 |
| 2023/0356091 A1* | 11/2023 | Eisenberg | ............... | A63F 13/79 |
| 2023/0376938 A1* | 11/2023 | Frix | ................... | G06Q 30/0278 |
| 2024/0144262 A1* | 5/2024 | Zhang | ................... | H04L 9/3213 |
| 2024/0261692 A1* | 8/2024 | Sliwka | .................. | H04L 9/3213 |

FOREIGN PATENT DOCUMENTS

| | | | |
|---|---|---|---|
| WO | 2021/231911 A1 | | 11/2021 |
| WO | WO-2023177211 A1 | * | 9/2023 |

OTHER PUBLICATIONS

E.l.f. cosmetics NFT paired with market launch, https://moversshakers.co/elf-nft-crypto-case-study, downloaded Dec. 29, 2022, 2 pages.
Clinique NFT, https://www.clinique.com/nft, downloaded Dec. 29, 2022, 2 pages.
NARS NFT, https://www.voguebusiness.com/technology/nars-joins-nft-hype-as-beauty-tests-potential, downloaded Dec. 29, 2022, 11 pages.
Estee Lauder Metaverse NFT demonstrating product performance, https://www.beautypackaging.com/contents/view_breaking-news/2022-03-24/estee-lauder-to-offer-nfts-at-decentraland-metaverse-fashion-week/, downloaded Dec. 29, 2022, 11 pages.
French Search Report and Written Opinion mailed Oct. 2, 2013 (with concise English descriptions), issued in corresponding French Application No. FR 2303800, filed Apr. 17, 2023, 8 pages.

* cited by examiner

*Primary Examiner* — Asher D Kells
(74) *Attorney, Agent, or Firm* — Christensen O'Connor Johnson Kindness PLLC

(57) ABSTRACT

In some embodiments, a computer-implemented method of dynamically updating a rendering of a dynamic item is provided. A computing system receives a request to render a dynamic item. The computing system determines a difference between an initiating condition associated with a non-fungible token (NFT) for the dynamic item and a present state. The computing system generates a rendering of the dynamic item based on the difference between the initiating condition and the present state. The computing system causes the rendering to be presented.

20 Claims, 4 Drawing Sheets

UPDATING RENDERINGS OF DYNAMIC ITEMS BASED ON CRYPTOGRAPHICALLY SECURE TRANSACTIONS

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of dynamically updating a rendering of a dynamic item is provided. A computing system receives a request to render a dynamic item. The computing system determines a difference between an initiating condition associated with a non-fungible token (NFT) for the dynamic item and a present state. The computing system generates a rendering of the dynamic item based on the difference between the initiating condition and the present state. The computing system causes the rendering to be presented.

In some embodiments, a non-transitory computer-readable medium having computer-executable instructions stored thereon is provided. The instructions, in response to execution by one or more processors of a computing system, cause the computing system to perform actions for dynamically updating a rendering of a dynamic item, the actions comprising: receiving, by a computing system, a request to render a dynamic item; determining, by the computing system, a difference between an initiating condition associated with a non-fungible token (NFT) for the dynamic item and a present state; and generating, by the computing system, a rendering of the dynamic item based on the difference between the initiating condition and the present state; and causing, by the computing system, the rendering to be presented.

In some embodiments, a system for dynamically updating a rendering of a dynamic item is provided. The system comprises circuitry for receiving a request to render a dynamic item; circuitry for determining a difference between an initiating condition associated with a non-fungible token (NFT) for the dynamic item and a present state; and circuitry for generating a rendering of the dynamic item based on the difference between the initiating condition and the present state; and circuitry for causing the rendering to be presented.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
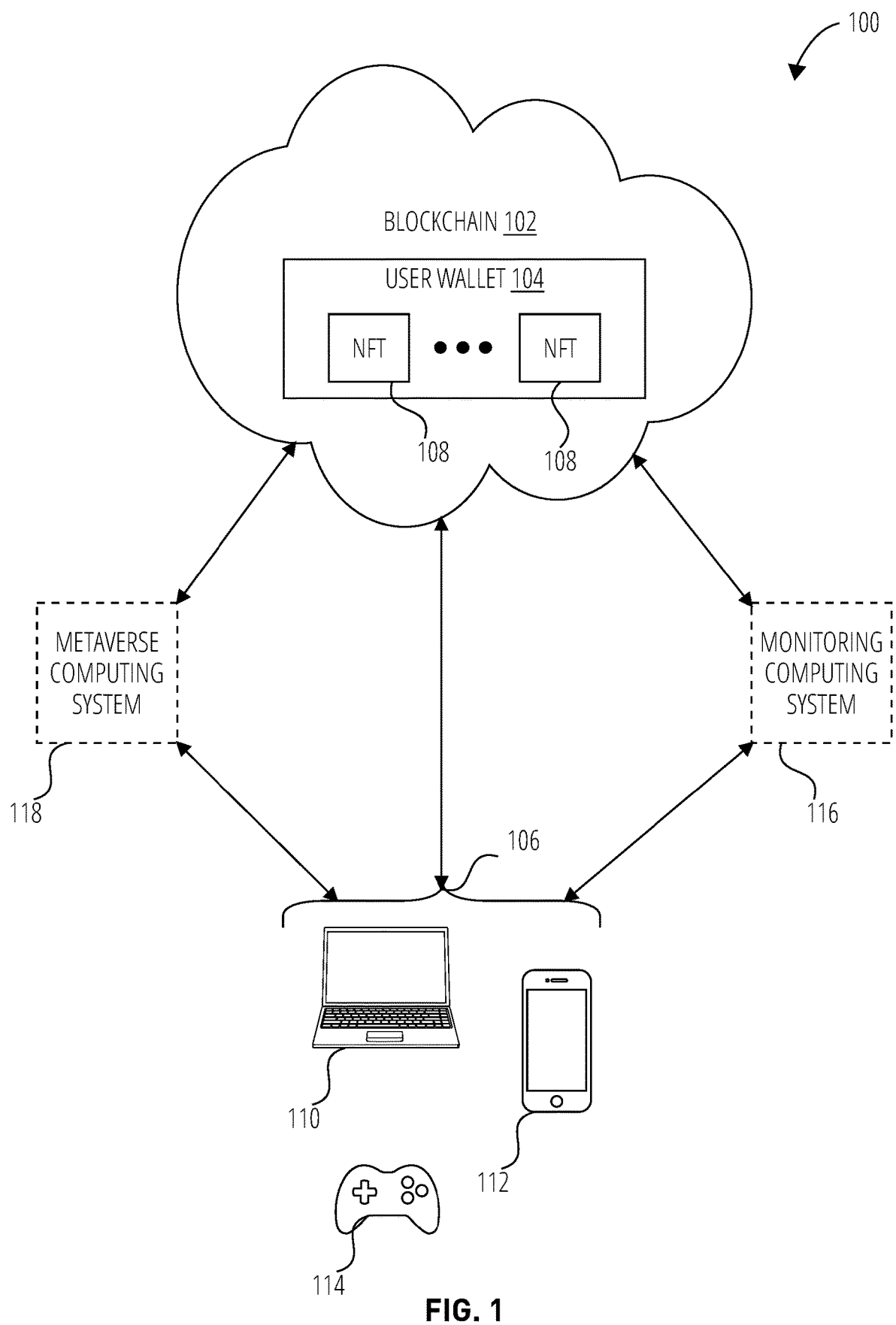
FIG. 1 is a schematic diagram illustrating a non-limiting example embodiment of a system for providing renderings of dynamic items according to various aspects of the present disclosure.

The technology known as "blockchain"—a distributed ledger in which cryptographically secure transactions can be stored—is gaining widespread acceptance and finding an increasing number of uses. A common use of blockchain technology is to implement a "wallet" that associates transactions on the blockchain with an owner of the wallet. In its most simple form, a transaction associated with a wallet may indicate an amount of cryptocurrency transferred into or out of the wallet. Some blockchain implementations also support the execution of smart contracts. A smart contract is a piece of executable code that is executed as part of storing a transaction on the blockchain.

A non-fungible token, or NFT, is a specific type of record stored on a blockchain. Typically, an NFT includes a reference to an asset (often, an image file, an animation file, or a video file) and a smart contract that includes a set of rules that are executed while storing transactions related to the NFT (including but not limited to creating one of a limited number of new unique copies of the NFT after an original "minting" of the NFT, and transferring ownership of a copy of the NFT to a new wallet). At a basic level, an exchange of an NFT is often thought of as exchanging a unique copy of the referenced asset. The ability to use and implement blockchains, wallets, and NFTs in general is possessed by those of ordinary skill in the art, and so additional detail about the specifics of how to implement basic versions of these technologies is not provided herein for the sake of brevity.

Up to the present time, NFTs have typically been static. That is, renderings of an asset associated with an NFT (such as an image, an animation, or a video) does not change over time. This is not a particularly realistic representation of real-world items, particularly consumable items which are diminished with prolonged use, or products that produce an observable benefit over time ("dynamic items"). What is desired are techniques for creating and managing NFTs that are associated with dynamic items, such that the renderings of the dynamic items change over time. For example, a rendering of a dynamic item may be generated in a way that appears to decay or improve over time.

One new problem introduced by NFTs that represent dynamic items is that eventually, the rendering of the dynamic item may appear to be completely diminished or completely improved over time. This is a problem because one purpose of NFTs is to facilitate secure trading of NFTs between wallets, and if an asset associated with an NFT is rendered as fully diminished or fully improved, there is little incentive for a new user to acquire the NFT from its current owner. Further, traditional techniques for updating the state of virtual objects, such as checking subscription status, etc., are typically insecure and would necessitate a complex integration between a traditional system and the blockchain storing the NFT.

In embodiments of the present disclosure, techniques are used that update the state of an NFT associated with a dynamic item, such that the dynamic item can be refreshed in a cryptographically secure manner. Embodiments of the present disclosure determine an amount of change to apply to a rendering of an NFT based on an amount of time that has passed since an initiating condition, such as a purchase or trade of the NFT occurred and was recorded in a transaction on the blockchain. Upon detecting a new occurrence of an initiating condition (e.g., a new trade of the NFT, a related wallet transaction, or other types of initiating conditions), the rendering can be restored to an initial state and be updated over time again, either for the existing owner or for a new owner.

FIG. 1 is a schematic diagram illustrating a non-limiting example embodiment of a system for providing renderings of dynamic items according to various aspects of the present disclosure.

In the system 100, records defining a user wallet 104 are stored in a blockchain 102. In some embodiments, the blockchain 102 may be a public blockchain capable of storing NFTs, including but not limited to Ethereum. In some embodiments, the blockchain 102 may be a private blockchain.

As illustrated, the records in the user wallet 104 indicate that the user wallet 104 includes one or more NFTs 108, at least one of which is associated with a dynamic item. The NFT 108 associated with a dynamic item may be minted by a provider of the dynamic item, and may be acquired by the user wallet 104 from the provider.

One or more end user computing systems 106 are configured to interact with the blockchain 102. The end user computing systems 106 may be any suitable type of computing system, including but not limited to a laptop computing system 110, a mobile computing system 112, a console computing system 114, or any other suitable type of computing system for performing the described interactions within the system 100.

In some embodiments, the end user computing system 106 is configured with an application, circuitry, or other computer-readable instructions that, when executed by the end user computing system 106, causes the end user computing system 106 to generate and/or present a rendering of a dynamic item associated with an NFT 108. Often, the rendering of the dynamic item will take the form of an image, an animation, a video, or another visual presentation generated by the end user computing system 106 and/or presented on a display device of the end user computing system 106. In some embodiments, a given end user computing system 106 manages transactions for a given NFT 108, and also generates/presents the associated dynamic item. In some embodiments, a first end user computing system 106 may manage transactions for a given NFT 108, and a second end user computing system 106 may generate/present the associated dynamic item.

In some embodiments, an end user computing system 106 may collect information (including but not limited to reviewing transactions on the blockchain 102) on which to base the rendering, generate the rendering, and present the rendering, without relying on other computing devices. In some embodiments, the system 100 includes other computing systems that assist in at least some of these actions.

For example, in some embodiments, a monitoring computing system 116 may be included in the system 100. The monitoring computing system 116 may collect and analyze information from external sources, including but not limited to social media systems, news services, calendars, schedules, or other external sources. The collected information and/or the analysis thereof may be provided by the monitoring computing system 116 to the end user computing systems 106 to serve as a further basis for generating renderings of dynamic items. The collected information and/or the analysis thereof may also be stored by the monitoring computing system 116 in the blockchain 102, either in the user wallet 104 or elsewhere, to cryptographically ensure the reliability of the information.

As another example, in some embodiments, a metaverse computing system 118 may be included in the system 100. A metaverse computing system 118 provides a virtual reality environment, an augmented reality environment, or another type of environment that presents virtual objects to users participating therein. The metaverse computing system 118 may be configured to generate renderings of NFTs 108 within its virtual environment, which are then presented by the end user computing systems 106. The NFTs 108 may allow a given NFT 108 to be used within more than one metaverse computing system 118, and/or by a metaverse computing system 118 as well as by other systems. This cross-platform compatibility is yet another technical benefit of the use of NFTs 108 to represent dynamic items.

Figure 2:
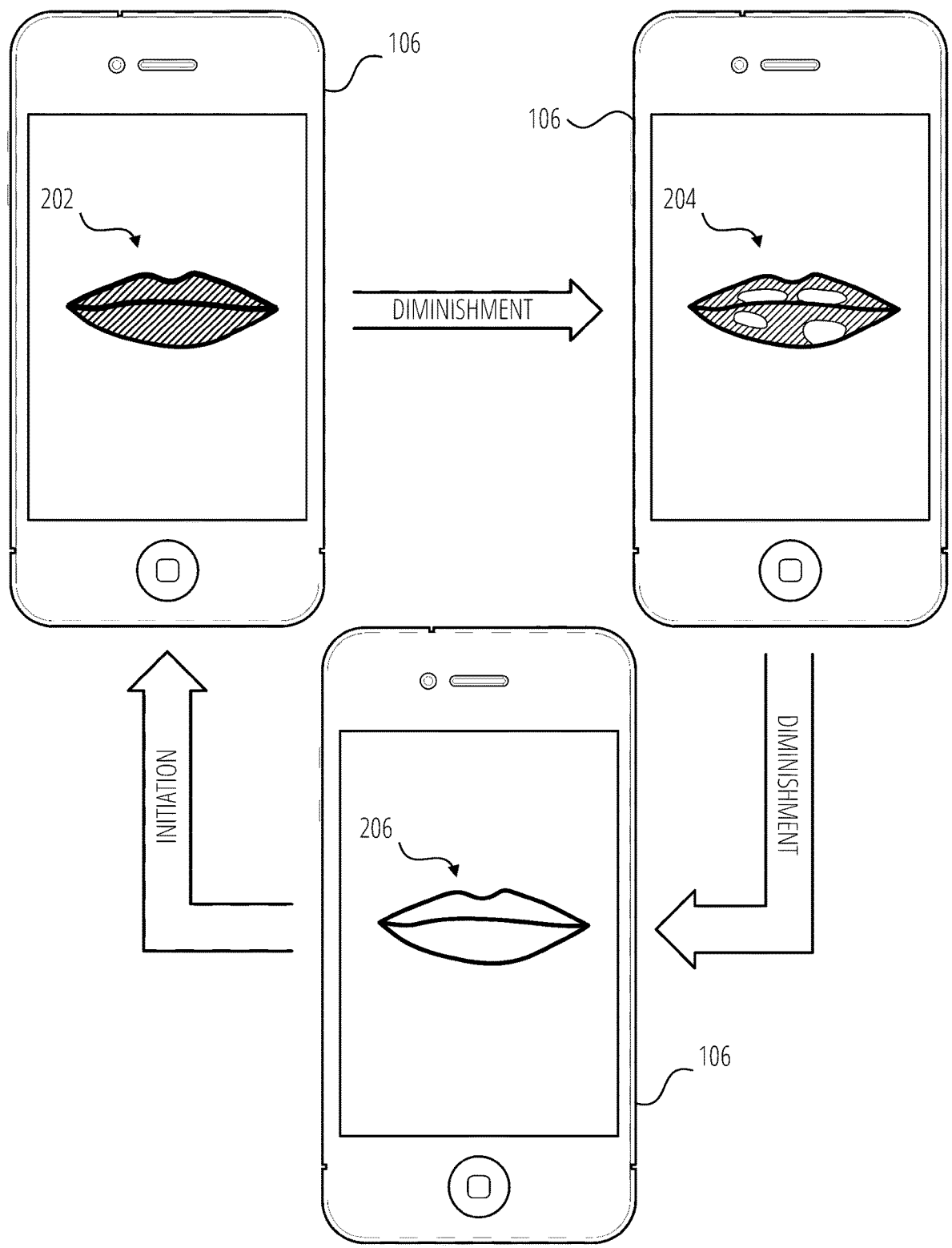
FIG. 2 illustrates a non-limiting example embodiment of a rendering of a dynamic item at various levels of diminishment according to various aspects of the present disclosure

FIG. 2 illustrates a non-limiting example embodiment of a rendering of a dynamic item at various levels of diminishment according to various aspects of the present disclosure. In the illustrated embodiment, the dynamic item is a lip color (a lipstick, lip gloss, or other lip color product), and the rendering is of lips having the lip color applied thereon. The lips may be taken from a photograph of a model, an artistic rendering of lips, an image or video of a user, or any other suitable image, and the rendering of the lip color may be superimposed or otherwise added to the depiction of the lips.

As shown in FIG. 2, the renderings are depicted on an end user computing system 106 at three different points: in a first rendering 202, the dynamic item (the lip color) is illustrated after detection of an initiating condition. In the first rendering 202, the lip color is shown as it would appear shortly after being applied, with no visible worn areas. In a second rendering 204, the effects of some diminishment are made apparent as some areas of missing color, similar to how the lip color would appear after a period of wear. In a third rendering 206, the lip color has been fully diminished, and the lips appear without any color applied. At any point after the first rendering 202 (including after the second rendering 204 and/or after the third rendering 206), a new initiating condition may be detected, and the next presented rendering may be similar to the first rendering 202.

A lip color is illustrated as the dynamic item in FIG. 2 for the sake of simplicity, but should not be seen as limiting. In other embodiments, other types of diminishable dynamic items may be rendered. For example, an eye color (e.g., eye liner, eye shadow, mascara, etc.), a blush, a foundation, a nail polish, or another cosmetic may be rendered as the dynamic item. As another example, a translucent or transparent container having a liquid substance depicted therein may be the dynamic item, with diminishment causing a level of the liquid substance (e.g., toner, moisturizer, shampoo, conditioner, sunscreen, etc.) within the container to be lowered. As yet another example, application of a hair product (e.g., conditioner, anti-frizz serum, dye, perm lotion, relaxer, etc.) may be the dynamic item, with a rendering of a hairstyle that reflects a state of hair immediately after application of the hair product being present in the first rendering, with the diminishment indicating the effect of the hair product wearing off (e.g., frizz returning, an original color showing at the roots, a loss of shine and/or definition, a natural amount of curl returning, etc.). As still another example, the dynamic item may include more than one product, such as for a makeup look that includes a lip color, a lip liner, an eyeshadow, an eye liner, and/or other combinations of products.

Further, a diminishable dynamic item is illustrated in FIG. 2, but this should also not be seen as limiting. In some embodiments, an improvable dynamic item may illustrate an additive or developing benefit over time, instead of wearing off, and the rendered change over time may indicate the benefit. For example, for a dynamic item such as a serum to improve a clinical sign of aging (e.g., dryness, fine lines, wrinkles, hyperpigmentation, etc.) the first rendering may illustrate an initial state before use of the serum, the second rendering may show an improvement of the clinical sign of aging, and the third rendering may show a resolution of the clinical sign of aging, with a new initiating condition returning the rendering to the initial state.

Figure 3:
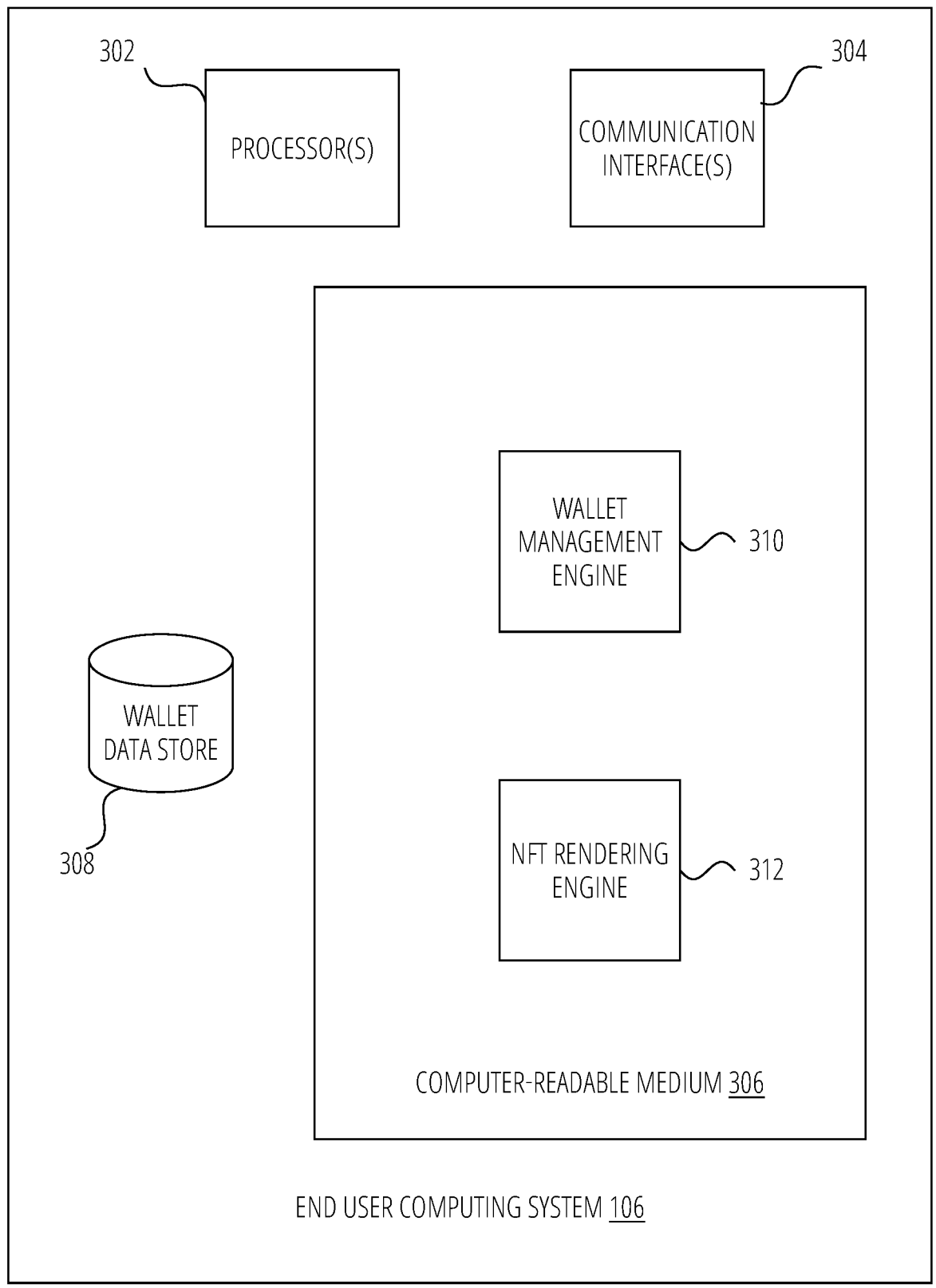
FIG. 3 is a block diagram that illustrates aspects of a non-limiting example embodiment of an end user computing system according to various aspects of the present disclosure.

FIG. 3 is a block diagram that illustrates aspects of a non-limiting example embodiment of an end user computing system according to various aspects of the present disclosure. The illustrated end user computing system 106 of FIG. 3 shows components that may be present in any type of end user computing system 106 illustrated in FIG. 1, or other types of end user computing systems 106 for use in the system 100. In some embodiments, components illustrated as part of the end user computing system 106 in FIG. 3 may actually be present in a different computing system of the system 100 (as a non-limiting example, the NFT rendering engine 312 or a portion thereof may be present in the metaverse computing system 118), or may be provided in a group of computing systems working together. To that end, the illustrated end user computing system 106 may be implemented by any computing device or collection of computing devices.

As shown, the end user computing system 106 includes one or more processors 302, one or more communication interfaces 304, a wallet data store 308, and a computer-readable medium 306.

In some embodiments, the processors 302 may include any suitable type of general-purpose computer processor. In some embodiments, the processors 302 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 304 include one or more hardware and or software interfaces suitable for providing communication links between components. The communication interfaces 304 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 306 has stored thereon logic that, in response to execution by the one or more processors 302, cause the end user computing system 106 to provide a wallet management engine 310 and an NFT rendering engine 312.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the wallet management engine 310 is configured to implement transactions on and/or read information from the blockchain 102. The wallet management engine 310 may use a private key stored in the wallet data store 308 to access the user wallet 104. In some embodiments, the wallet data store 308 is present on the end user computing system 106 (e.g., a "cold wallet"). In some embodiments, the wallet data store 308 is present on and managed by a computing system separate from the end user computing system 106 (e.g., a "hot wallet"). In some embodiments, the NFT rendering engine 312 is configured to generate and cause presentation of dynamic items. Further description of the configuration of each of these components is provided below.

As used herein, "engine" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 4:
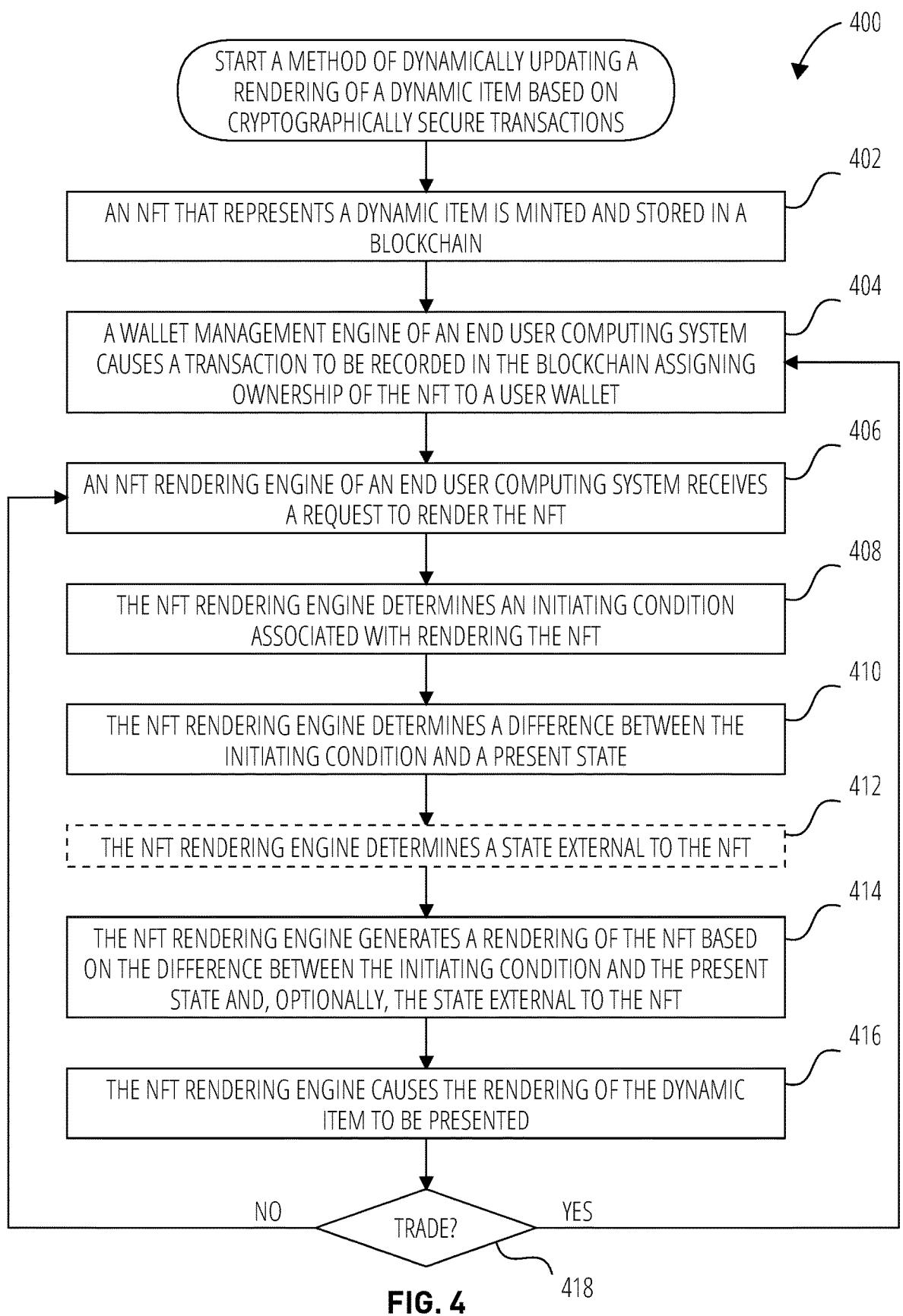
FIG. 4 is a flowchart that illustrates a non-limiting example embodiment of a method of updating a rendering of a dynamic item based on cryptographically secure transactions according to various aspects of the present disclosure.

FIG. 4 is a flowchart that illustrates a non-limiting example embodiment of a method of dynamically updating a rendering of a dynamic item based on cryptographically secure transactions according to various aspects of the present disclosure.

From a start block, the method 400 proceeds to block 402, where a non-fungible token (NFT 108) that represents a dynamic item is minted and stored in a blockchain 102. As known to one of ordinary skill in the art, the process of minting the NFT 108 causes a record to be created in the blockchain 102 that includes at least a timestamp of its creation, a unique identifier associated with the NFT 108, a smart contract that specifies rules that will be executed when transferring the NFT 108 to a new wallet (including but not limited to one or more of a maximum number of copies of the NFT 108 that may be created, and/or rules for compensating the minter of the NFT 108 upon subsequent resales of the NFT 108), and a reference to a dynamic item to be rendered. In some embodiments, the reference to the dynamic item may be a URL, URI, or other type of reference to a location from which the dynamic item may be downloaded. In some embodiments, the reference to the dynamic item may be a reference to a location on the blockchain 102 from which the dynamic item may be downloaded. In some embodiments, the dynamic item may be an image, an overlay, a pattern, a color, or other data that may be used by software configured to generate renderings based on the data. In some embodiments, the dynamic item may be executable code that can itself be executed to generate renderings of the dynamic item.

At block 404, a wallet management engine 310 of an end user computing system 106 causes a transaction to be recorded in the blockchain 102 assigning ownership of the NFT 108 to a user wallet 104. At a high level, this can be described as a user of the user wallet 104 "buying" the NFT 108, either from the original minter or from a previous owner. Though described as "buying" the NFT 108, in some embodiments, the transaction may not involve an exchange of monetary value or cryptocurrency, but may instead be authorized via permission from the minter or the previous owner, or may include a zero-value transfer of value. In some embodiments, the transaction includes at least a timestamp and an identity of the user wallet 104 to which ownership of the NFT 108 is to be assigned. Other aspects of the recording of a transaction in the blockchain 102 are known to those of ordinary skill in the art, and so are not described further herein for the sake of brevity.

At block 406, an NFT rendering engine 312 of an end user computing system 106 receives a request to render the NFT 108. In some embodiments, the end user computing system 106 may be an end user computing system 106 associated with the user of the user wallet 104 (that is, the user of the end user computing system 106 may be requesting to render their own NFT 108). In some embodiments, the end user computing system 106 may be an end user computing system 106 associated with a different user than the user of the user wallet 104 (that is, a user of the end user computing system 106 may be requesting to render another user's NFT 108). The request to render the NFT 108 may occur in any context. For example, the end user computing system 106 may provide an application that allows a user to browse NFTs 108 within the user wallet 104 (or within the wallets of other users). As another example, the end user computing system 106 (along with, optionally, the metaverse computing system 118) may provide an interface in which NFTs 108 are presented in a virtual environment. As yet another example, the end user computing system 106 may generate an interface to a social networking application in which NFTs 108 are associated with avatars, user portraits, or otherwise associated with users of the virtual environment.

At block 408, the NFT rendering engine 312 determines an initiating condition associated with rendering the NFT 108. The initiating condition is a transaction or other activity on the blockchain 102 which causes the dynamic item associated with the NFT 108 to be rendered in its original state. By using a transaction or other activity on the blockchain 102 as the initiating condition, the initiation of the NFT 108 (i.e., the initial rendering of the dynamic item in its original state) is cryptographically secure and less vulnerable to tampering. In some embodiments, the type of event to find within the blockchain 102 to identify the initiating condition may be specified within the NFT 108 itself. In some embodiments, the type of event to find within the blockchain 102 to identify the initiating condition may be specified within the NFT rendering engine 312.

Any suitable event and/or combination of events may be used as the initiating condition. In some embodiments, a change in ownership of the NFT 108 is used as the initiating condition, such that a diminishable dynamic item appears to be refreshed or an improvable dynamic item appears to be unimproved each time ownership of the NFT 108 changes (such as after the original purchase of the NFT 108 from the minter, or after a subsequent trade of the NFT 108). In some embodiments, other events on the blockchain 102 may be used as the initiating condition, including but not limited to an exchange of cryptocurrency for a predetermined physical product, ownership of one or more other predetermined NFTs 108 (such as one or more other NFTs 108 from a specific set of items like multiple NFTs 108 associated with a particular look), receipt of one or more proof-of-attendance tokens associated with predetermined events, or combinations thereof.

At block 410, the NFT rendering engine 312 determines a difference between the initiating condition and a present state. Typically, the difference determined between the initiating condition and the present state is a length of time that has elapsed between a time associated with the initiating condition (e.g., a timestamp of the associated transaction on the blockchain 102) and a present time. In some embodiments, other differences may be determined. For example, in some embodiments, the initiating condition may be a minimum initial balance being present in an account tracked by the user wallet 104, and the difference may be a difference in amount between the initial balance and the current balance.

At optional block 412, the NFT rendering engine 312 determines a state external to the NFT 108. While the use of blockchain transactions to specify initiating conditions for rendering dynamic items is useful for improving the security of initiation, it may also be desirable to have rendering of a dynamic item be responsive to other states as well. For example, a trending color, a trending product, or another trend identified in social media postings may be considered as a state external to the NFT 108. As another example, a user's own engagement on social media with a post promoting the NFT 108 or the dynamic item, the minter of the NFT 108, or any other predetermined entity may be considered as a state external to the NFT 108. As yet another example, a message sent by an influencer, celebrity, or other individual to activate or alter a state of the NFT 108, either via a social networking platform or another communication modality, may be considered as a state external to the NFT 108. As yet another example, a time of year, a time of day, a holiday, or another calendar-related event could be considered as a state external to the NFT 108 in order to alter the rendering to be appropriate for the calendar-related state.

In some embodiments, the NFT rendering engine 312 may itself determine the state external to the NFT 108 by directly monitoring external data sources. In some embodiments, the NFT rendering engine 312 may retrieve the state external to the NFT 108 from the monitoring computing system 116, which in turn conducts the determination to be provided to the NFT rendering engine 312. Optional block 412 is illustrated as optional because in some embodiments, the dynamic features of the NFT 108 may be determined solely based on the difference determined at block 410.

At block 414, the NFT rendering engine 312 generates a rendering of the NFT 108 based on the difference between the initiating condition and the present state and, optionally, the state external to the NFT 108. As illustrated in FIG. 2, the length of time may be used to determine an amount of diminishment or improvement to apply to the dynamic item in the rendering. In some embodiments, the NFT 108 may specify an amount of time after which full diminishment or improvement should be applied, and the NFT rendering engine 312 may determine an amount of change to render by comparing the determined length of time to the full diminishment amount of time (e.g., if the determined length of time is 50% of the full diminishment amount of time, the dynamic item may be diminished in the rendering by 50%). In some embodiments, the amount of change may be non-linear. That is, a smaller proportional amount of change may be applied if the length of time is relatively shorter, and a larger proportional amount of change may be applied if the length of time is relatively longer, to more closely represent real-world use of an associated product.

If used, the state external to the NFT 108 may be used as a basis for the rendering of the NFT 108 in any suitable way. For example, if the state external to the NFT 108 includes a trending color or trending product, the color or other aspects of the rendering of the dynamic item may be changed to match the trending color or trending product. As another example, if the state external to the NFT 108 indicates that a loyalty threshold has been reached, a number of other products have been purchased, or some other external condition has been met, the amount of diminishment applied to the dynamic item may be reduced accordingly.

At block 416, the NFT rendering engine 312 causes the rendering of the dynamic item to be presented. In some embodiments, the rendering of the dynamic item is provided on a display device of the end user computing system 106. In some embodiments, the rendering of the dynamic item is provided on another computing system.

The method 400 then proceeds to decision block 418, where a determination is made regarding whether the NFT 108 is to be traded. The trade of the NFT 108 may constitute a new initiating condition, and may cause the dynamic item to be reset (as indicated in the transition back to the first rendering 202 in FIG. 2).

If the determination is that the NFT 108 is to be traded (or another initiating condition is to occur), then the result of decision block 418 is YES, and the method 400 returns to block 404 to record the trade. The method 400 then proceeds to process rendering requests for the NFT 108 using the updated initiating condition. Otherwise, if it is not determined that the NFT 108 is to be traded, then the result of decision block 418 is NO, and the method 400 returns to block 406 to process rendering requests for the NFT 108 using the original initiating condition. By not trading the NFT 108, the difference between the initiating condition and the present state will continue to increase, and the amount of change applied to the dynamic item in subsequent renderings will increase accordingly.

In some embodiments, the method 400 may execute indefinitely. In some embodiments, the method 400 may terminate at any point in response to a user request, in response to an unavailability of a portion of the system 100, or for any other reason.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method of dynamically updating a rendering of a dynamic item, the method comprising:
receiving, by a computing system, a first request to render a dynamic item;
determining, by the computing system, a first difference between a first initiating condition associated with a non-fungible token (NFT) for the dynamic item and a present state when the first request is received;
generating, by the computing system, a first rendering of the dynamic item to indicate an amount of change of the dynamic item from an unaltered state based on an amount of the first difference;
causing, by the computing system, the first rendering to be presented;
receiving, by the computing system, a second request to render the dynamic item;
determining, by the computing system, a second difference between a second initiating condition associated with the NFT for the dynamic item and a present state when the second request is received;
generating, by the computing system, a second rendering of the dynamic item to indicate an amount of change of the dynamic item from the unaltered state based on an amount of the second difference; and
causing, by the computing system, the second rendering to be presented.

2. The computer-implemented method of claim 1, wherein determining the first difference between the first initiating condition and the present state when the first request is received includes determining a length of time between a time associated with the first initiating condition and a present time when the first request is received.

3. The computer-implemented method of claim 2, wherein generating the first rendering of the dynamic item to indicate the amount of change of the dynamic item from the unaltered state based on the amount of the first difference includes generating the first rendering to indicate an amount of change of the dynamic item based on the length of time.

4. The computer-implemented method of claim 3, wherein the dynamic item is a lip color, and wherein generating the first rendering to indicate the amount of change of the dynamic item based on the length of time includes generating the first rendering to show a worn-off area of the lip color based on the length of time.

5. The computer-implemented method of claim 3, wherein the dynamic item is a container containing a liquid substance, and wherein generating the first rendering to indicate the amount of change of the dynamic item based on the length of time includes generating the first rendering to show a level of liquid substance in the container based on the length of time.

6. The computer-implemented method of claim 2, wherein the time associated with the first initiating condition is a timestamp of a transaction recorded on a blockchain for a wallet that includes the NFT.

7. The computer-implemented method of claim 6, wherein the transaction recorded on the blockchain is associated with a change in ownership of the NFT, an exchange of cryptocurrency for a predetermined product, or a proof-of-attendance token for a predetermined event.

8. The computer-implemented method of claim 1, wherein the first rendering is further based on a state external to the NFT, wherein the state external to the NFT includes one or more of a determination of a social media trend, a detection of a social media posting from a predetermined individual, a time of year, or other NFTs stored in a wallet that includes the NFT.

9. A non-transitory computer-readable medium having computer-executable instructions stored thereon that, in response to execution by one or more processors of a computing system, cause the computing system to perform actions for dynamically updating a rendering of a dynamic item, the actions comprising:
receiving, by a computing system, a first request to render a dynamic item;
determining, by the computing system, a first difference between a first initiating condition associated with a non-fungible token (NFT) for the dynamic item and a present state when the first request is received;
generating, by the computing system, a first rendering of the dynamic item to indicate an amount of change of the dynamic item from an unaltered state based on an amount of the first difference;
causing, by the computing system, the first rendering to be presented;
receiving, by the computing system, a second request to render the dynamic item;
determining, by the computing system, a second difference between a second initiating condition associated with the NFT for the dynamic item and a present state when the second request is received;
generating, by the computing system, a second rendering of the dynamic item to indicate an amount of change of the dynamic item from the unaltered state based on an amount of the second difference; and
causing, by the computing system, the second rendering to be presented.

10. The non-transitory computer-readable medium of claim 9, wherein determining the first difference between the first initiating condition and the present state when the first request is received includes determining a length of time between a time associated with the first initiating condition and a present time when the first request is received.

11. The non-transitory computer-readable medium of claim 10, wherein generating the first rendering of the dynamic item to indicate the amount of change of the dynamic item from the unaltered state based on the amount of the first difference includes generating the first rendering to indicate an amount of change of the dynamic item based on the length of time.

12. The non-transitory computer-readable medium of claim 11, wherein the dynamic item is a lip color, and wherein generating the first rendering to indicate the amount of change of the dynamic item based on the length of time includes generating the first rendering to show a worn-off area of the lip color based on the length of time.

13. The non-transitory computer-readable medium of claim 11, wherein the dynamic item is a container containing a liquid substance, and wherein generating the first rendering to indicate the amount of change of the dynamic item based on the length of time includes generating the first rendering to show a level of the liquid substance in the container based on the length of time.

14. The non-transitory computer-readable medium of claim 10, wherein the time associated with the first initiating condition is a timestamp of a transaction recorded on a blockchain for a wallet that includes the NFT.

15. The non-transitory computer-readable medium of claim 14, wherein the transaction recorded on the blockchain is associated with a change in ownership of the NFT, an exchange of cryptocurrency for a predetermined product, or a proof-of-attendance token for a predetermined event.

16. The non-transitory computer-readable medium of claim 9, wherein the first rendering is further based on a state external to the NFT, wherein the state external to the NFT includes one or more of a determination of a social media trend, a detection of a social media posting from a predetermined individual, a time of year, or other NFTs stored in a wallet that includes the NFT.

17. A system for dynamically updating a rendering of a dynamic item, the system comprising:
circuitry for receiving a first request to render a dynamic item;
circuitry for determining a first difference between a first initiating condition associated with a non-fungible token (NFT) for the dynamic item and a present state when the first request is received;
circuitry for generating a first rendering of the dynamic item to indicate an amount of change of the dynamic item from an unaltered state based on an amount of the first difference;
circuitry for causing the first rendering to be presented;
circuitry for receiving a second request to render the dynamic item;
circuitry for determining a second difference between a second initiating condition associated with the NFT for the dynamic item and a present state when the second request is received;
circuitry for generating a second rendering of the dynamic item to indicate an amount of change of the dynamic item from the unaltered state based on an amount of the second difference; and
circuitry for causing the second rendering to be presented.

18. The system of claim 17, wherein determining the first difference between the first initiating condition and the present state when the first request is received includes determining a length of time between a time associated with the first initiating condition and a present time when the first request is received, and
wherein generating the first rendering of the dynamic item to indicate the amount of change of the dynamic item from the unaltered state based on the amount of the first difference includes generating the first rendering to indicate an amount of change of the dynamic item based on the length of time.

19. The system of claim 18, wherein the dynamic item is a lip color, and wherein generating the first rendering to indicate the amount of change of the dynamic item based on the length of time includes generating the first rendering to show a worn-off area of the lip color based on the length of time; or
wherein the dynamic item is a container containing a liquid substance, and wherein generating the first rendering to indicate the amount of change of the dynamic item based on the length of time includes generating the rendering to show a level of liquid substance in the container based on the length of time.

20. The system of claim 18, wherein the time associated with the first initiating condition is a timestamp of a transaction recorded on a blockchain for a wallet that includes the NFT, and
wherein the transaction recorded on the blockchain is associated with a change in ownership of the NFT, an exchange of cryptocurrency for a predetermined product, or a proof-of-attendance token for a predetermined event.

\* \* \* \* \*